United States Patent
Machida et al.

(10) Patent No.: US 8,088,513 B2
(45) Date of Patent: Jan. 3, 2012

(54) ANODE AND BATTERY

(75) Inventors: Masaki Machida, Fukushima (JP);
Masakazu Umehara, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/290,774

(22) Filed: Nov. 29, 2005

(65) Prior Publication Data

US 2006/0127765 A1 Jun. 15, 2006

(30) Foreign Application Priority Data

Nov. 30, 2004 (JP) ................ P2004-347295

(51) Int. Cl.
*H01M 4/13* (2010.01)
*H01M 4/62* (2006.01)
(52) U.S. Cl. ..................... 429/217
(58) Field of Classification Search ............ 429/17, 429/217
See application file for complete search history.

(56) References Cited

U.S. PATENT DOCUMENTS

| | | |
|---|---|---|
| 5,667,914 A | 9/1997 | Nagamine et al. |
| 2003/0113625 A1* | 6/2003 | Kim et al. ............... 429/217 |
| 2004/0209156 A1* | 10/2004 | Ren et al. ............... 429/49 |
| 2004/0234861 A1* | 11/2004 | Kawase et al. ......... 429/245 |
| 2005/0106462 A1* | 5/2005 | Jordy et al. ............ 429/231.1 |

FOREIGN PATENT DOCUMENTS

JP 08-315817 11/1996

OTHER PUBLICATIONS

Linden, David, The Handbook of Batteries, 1995, McGraw-Hill, Second Edition, pp. 36.22-36.24.*
Roth et al., DSC investigation of exothermic reactions occurring at elevated temperatures in lithium-ion anodes containing PVDF-based binders, Jul. 4, 2004 (online availability), Journal of Power Sources, vol. 134/Issue 2, pp. 222-234.*

* cited by examiner

*Primary Examiner* — Gregg Cantelmo
*Assistant Examiner* — Eugenia Wang
(74) *Attorney, Agent, or Firm* — K&L Gates LLP (57) ABSTRACT

A battery capable of inhibiting temperature increase and an anode used for it are provided. An anode active material layer contains an anode active material and a polymer containing a binder, vinylidene fluoride, as a component. A calorific value by differential scanning calorimetry in charging the anode active material layer is 500 J/g or less in the range from 230 deg C. to 370 deg C., and is preferably 400 J/g or less. Further, a difference between the maximum value of calorific value and a calorific value at 100 deg C. is 1.70 W/g or less, and is preferably 1.60 W/g or less.

7 Claims, 7 Drawing Sheets

ANODE AND BATTERY

CROSS REFERENCES TO RELATED APPLICATIONS

The present invention claims priority to Japanese Patent Application JP 2004-347295 filed in the Japanese Patent Office on Nov. 30, 2004, the entire contents of which is being incorporated herein by reference.

BACKGROUND

The present invention relates to an anode containing a binder and a battery using it.

In recent years, electronic devices commencing with a mobile phone and a notebook computer have become cordless and portable. Thin, small-sized, and light weight portable electronic devices have been developed one right after the other. Further, as the devices have become diversified, the power source usage amount has been increased. Therefore, high capacity of batteries, which is the energy source of these electronic devices, particularly of secondary batteries has been increasingly demanded.

As a secondary battery used in the past, there are a lead battery, a nickel cadmium battery and the like. Currently, a nickel hydrogen battery and a lithium ion secondary battery are in practical use.

Of the foregoing, the lithium ion secondary battery has a structure as follows, for example. A cathode in which $LiCoO_2$ as the cathode active material, graphite as an electrical conductor, and a binder such as polyvinylidene fluoride are layered together on a cathode current collector made of an aluminum thin plate; and an anode in which an anode active material such as carbon, cokes, and graphite and a binder are layered on an anode current collector made of a copper thin plate are layered with a thin film separator made of polypropylene, polyethylene or the like inbetween (for example, refer to Japanese Unexamined Patent Application Publication No. H08-315817).

Further, a polymer lithium ion secondary battery having a sandwich structure in which an electrolyte gelated by polyacrylonitrile, polyethylene oxide, polyvinylidene fluoride or the like is filled between an electrode and a separator has been in practical use.

When such a lithium ion secondary battery suffers damage from outside, Joule heat is generated by short circuit in the damaged section, and battery temperatures are increased. In this case, a current is blocked by a safety mechanism such as shutdown function by the separator. However, as described above, when polyvinylidene fluoride is used as a binder for the anode, there is a disadvantage that the battery temperatures are more increased due to exothermic reaction between fluorine contained in the polyvinylidene fluoride and lithium inserted in the anode.

SUMMARY

In view of the foregoing, in the present invention, it is desirable to provide a battery capable of inhibiting increase in battery temperatures and an anode used for it.

According to an embodiment of the present invention, there is provided an anode having an anode current collector and an anode active material layer provided on the anode current collector, in which the anode active material layer contains an anode active material and a polymer containing vinylidene fluoride as a component, and a calorific value by differential scanning calorimetry in charging the anode active material layer is 500 J/g or less in the range from 230 deg C. to 370 deg C.

According to an embodiment of the present invention, there is provided another anode having an anode current collector and an anode active material layer provided on the anode current collector, in which the anode active material layer contains an anode active material and a polymer containing vinylidene fluoride as a component, and a difference between the maximum value of calorific value and a calorific value at 100 deg C. by differential scanning calorimetry in charging the anode active material layer is 1.70 W/g or less.

According to an embodiment of the present invention, there is provided a battery including a cathode, an anode, and an electrolyte, in which the anode has an anode current collector and an anode active material layer provided on the anode current collector, the anode active material layer contains an anode active material and a polymer containing vinylidene fluoride as a component, and a calorific value by differential scanning calorimetry in charging the anode active material layer is 500 J/g or less in the range from 230 deg C. to 370 deg C.

According to an embodiment of the present invention, there is provided another battery including a cathode, an anode, and an electrolyte, in which the anode has an anode current collector and an anode active material layer provided on the anode current collector, the anode active material layer contains an anode active material and a polymer containing vinylidene fluoride as a component, and a difference between the maximum value of calorific value and a calorific value at 100 deg C. by differential scanning calorimetry in charging the anode active material layer is 1.70 W/g or less.

According to an anode of the embodiment of the present invention, the anode has the anode current collector and the anode active material layer provided on the anode current collector, the anode active material layer contains the anode active material and the polymer containing vinylidene fluoride as a component, and the calorific value by differential scanning calorimetry in charging is 500 J/g or less in the range from 230 deg C. to 370 deg C., or the difference between the maximum value of calorific value and a calorific value at 100 deg C. is 1.70 W/g or less. Therefore, exothermic reaction between the electrode reactant in the anode and fluorine in the polymer can be inhibited. Consequently, according to a battery of the embodiment of the present invention using the anode, increase in the battery temperatures can be inhibited.

In particular, when the calorific value in the range from 230 deg C. to 370 deg C. is 400 J/g or less, or the difference between the maximum value of calorific value and a calorific value at 100 deg C. is 1.60 W/g or less, increase in the battery temperatures can be further inhibited.

Additional features and advantages are described herein, and will be apparent from, the following Detailed Description and the figures.

DETAILED DESCRIPTION

An embodiment of the present invention will be hereinafter described in detail with reference to the drawings.

Figure 1:
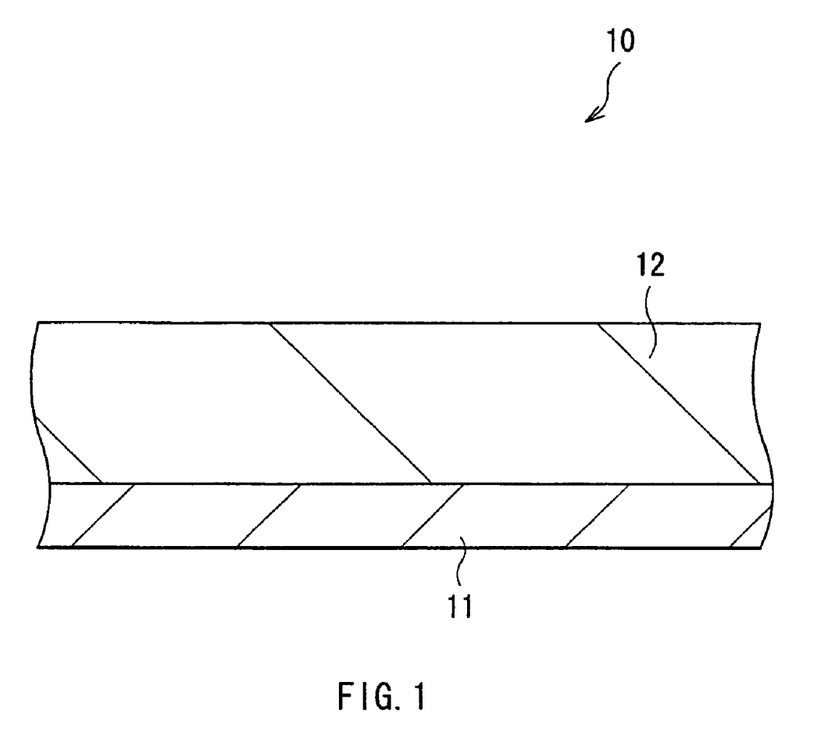
FIG. 1 is a cross section showing a structure of an anode according to an embodiment of the present invention.

FIG. 1 shows a structure of an anode 10 according to an embodiment of the present invention. The anode 10 has, for example, an anode current collector 11 having a pair of opposed faces and an anode active material layer 12 provided on the single face of the anode current collector 11. Though not shown, the anode active material layer 12 may be provided on the both faces of the anode current collector 11.

The anode current collector 11 preferably has favorable electrochemical stability, electric conductivity, and mechanical strength, and is made of a metal material such as copper, nickel, and stainless. In particular, copper is preferable since copper has high electric conductivity.

The anode active material layer 12 contains, for example, one or more anode materials capable of inserting and extracting lithium or the like as an anode active material. As an anode material capable of inserting and extracting lithium or the like, a carbon material, a metal oxide, a high molecular weight material or the like can be cited. As a carbon material, one or more carbon materials such as non-graphitizable carbon, graphitizable carbon, graphites, pyrolytic carbons, cokes, glassy carbons, an organic high molecular weight compound fired body, activated carbon, and carbon black can be used. Of the foregoing, cokes include pitch cokes, needle cokes, petroleum cokes and the like. The organic high molecular weight compound fired body is obtained by firing and carbonizing a high molecular weight compound such as a phenol resin and a furan resin at appropriate temperatures. Further, as a metal oxide, tin oxide or the like can be cited. As a high molecular weight material, polyacetylene, polypyrrole or the like can be cited.

As an anode material capable of inserting and extracting lithium or the like, a material capable of inserting and extracting lithium or the like, and contains at least one of metal elements and metalloid elements as an element can be also cited. When such a material is used, a high energy density can be obtained. Such an anode material may be a simple substance, an alloy, or a compound of a metal element or a metalloid element, or may have one or more phases thereof at least in part. In the present invention, alloys include an alloy containing one or more metal elements and one or more metalloid elements in addition to an alloy including two or more metal elements. Further, an alloy may contain nonmetallic elements. The texture thereof includes a solid solution, a eutectic crystal (eutectic mixture), an intermetallic compound, and a texture in which two or more thereof coexist.

As a metal element or a metalloid element composing such an anode material, magnesium (Mg), boron (B), aluminum, gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), platinum (Pt) or the like can be cited. Such element may be crystalline or amorphous.

Specially, as such an anode material, a material containing a metal element or a metalloid element of Group 4B in the short period periodic table as an element is preferable. A material containing at least one of silicon and tin as an element is particularly preferable. Silicon and tin have a high ability to insert and extract lithium, and provide a high energy density.

As an alloy of tin, for example, an alloy containing at least one from the group consisting of silicon, nickel, copper, iron, cobalt, manganese, zinc, indium, silver, titanium (Ti), germanium, bismuth, antimony (Sb), and chromium (Cr) as a second element other than tin can be cited. As an alloy of silicon, for example, an alloy containing at least one from the group consisting of tin, nickel, copper, iron, cobalt, manganese, zinc, indium, silver, titanium, germanium, bismuth, antimony, and chromium as a second element other than silicon can be cited.

As a compound of tin or a compound of silicon, for example, a compound containing oxygen (O) or carbon (C) can be cited. In addition to tin or silicon, the compound may contain the foregoing second element.

The anode active material layer 12 further contains a binder. As a binder, a polymer containing vinylidene fluoride as a component is preferable, since the polymer containing vinylidene fluoride has high stability in the battery. As such a polymer, for example, polyvinylidene fluoride or a copolymer containing vinylidene fluoride as a component can be cited. As a specific example of the copolymer, vinylidene fluoride-hexafluoropropylene copolymer, vinylidene fluoride-tetrafluoro ethylene copolymer, vinylidene fluoride-chloro trifluoro ethylene copolymer, vinylidene fluoride-hexafluoropropylene-tetrafluoro ethylene copolymer, a copolymer obtained by further copolymerizing other ethylene unsaturated monomer to any of the foregoing copolymers or the like can be cited. As a copolymerizable ethylene unsaturated monomer, ester acrylate, ester methacrylate, vinyl acetate, acrylonitrile, acrylic acids, methacrylic acid, anhydrous mallein, butadiene, styrene, N-vinyl pyrrolidone, N-vinyl pyridine, glycidyl methacrylate, hydroxyethyl methacrylate, methyl vinyl ether or the like can be cited. For the binder, one thereof may be used singly, or two or more thereof may be used by mixing.

In the binder, the amount of fluorine exothermically reacting with lithium or the like is decreased by, for example, heating at temperatures equal to or more than the melting point. Thereby, increase in battery temperatures due to exothermic reaction between lithium or the like inserted in the anode active material and fluorine in the binder is inhibited.

Specifically, when the anode active material layer 12 inserting lithium or the like, that is, the anode active material 12 in the state of being charged is provided with differential scanning calorimetry (DSC), in the range from 230 deg C. to 370 deg C., within which the reaction peak of lithium and fluorine exists, the total amount of calorific value is preferably 500 J/g or less, and is more preferably 400 J/g or less. Further, the difference between the maximum value of calorific value and the calorific value at 100 deg C. is preferably 1.70 W/g or less, and is more preferably 1.60 W/g or less. Within such ranges, effects to inhibit exothermic reaction are high.

The anode 10 can be manufactured as follows, for example.

First, for example, an anode material and a binder are mixed to prepare an anode mixture, which is dispersed in a solvent such as N-methyl-2-pyrrolidone to form anode mixture slurry. Next, an anode current collector 11 is coated with the anode mixture slurry, which is dried, and then the solvent is removed. After that, the resultant is compression-molded by a roll pressing machine or the like to form an anode active material layer 12. Thereby, the anode 10 shown in FIG. 1 is obtained.

The anode 10 is used for secondary batteries as follows, for example.

(First Secondary Battery)

Figure 2:
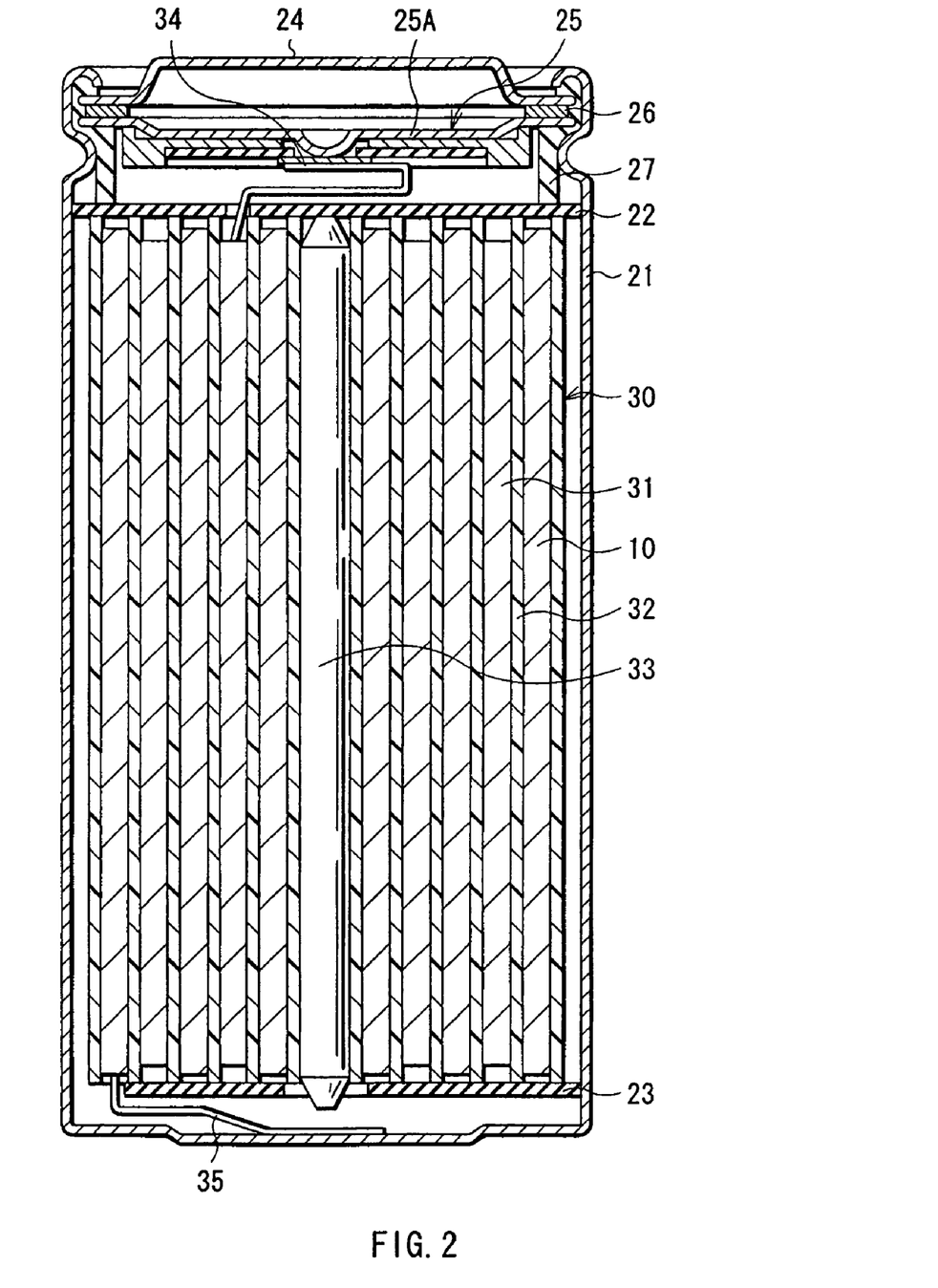
FIG. 2 is a cross section showing a structure of a secondary battery using the anode shown in FIG. 1.

FIG. 2 shows a cross sectional structure of the secondary battery. The secondary battery is a so-called cylinder-type battery, and has a spirally wound electrode body 30 in which a strip-shaped cathode 31 and the strip-shaped anode 10 are layered and wound with a separator 32 inbetween inside a battery can 21 in the shape of approximately hollow cylinder. The battery can 21 is made of, for example, iron plated by nickel. One end of the battery can 21 is closed, and the other end of the battery can 21 is opened. Inside the battery can 21, an electrolytic solution, which is the liquid electrolyte is injected and impregnated in the separator 32. A pair of insulating plates 22 and 23 is respectively arranged perpendicular to the winding periphery face, so that the spirally wound electrode body 30 is sandwiched between the insulating plates 22 and 23.

At the open end of the battery can 21, a battery cover 24, and a safety valve mechanism 25 and a PTC (Positive Temperature Coefficient) device 26 provided inside the battery cover 24 are attached by being caulked through a gasket 27. Inside of the battery can 21 is thereby hermetically sealed. The battery cover 24 is, for example, made of a material similar to that of the battery can 21. The safety valve mechanism 25 is electrically connected to the battery cover 24 through the PTC device 26. When the internal pressure of the battery becomes a certain level or more by internal short circuit, external heating or the like, a disk plate 25A flips to cut the electrical connection between the battery cover 24 and the spirally wound electrode body 30. When temperatures rise, the PTC device 26 limits a current by increasing the resistance value to prevent abnormal heat generation by a large current. The gasket 27 is made of, for example, an insulating material and its surface is coated with asphalt.

For example, the spirally wound electrode body 30 is wound centering on a center pin 33. A cathode lead 34 made of aluminum or the like is connected to the cathode 31 of the spirally wound electrode body 30. An anode lead 35 made of nickel or the like is connected to the anode 10. The cathode lead 34 is electrically connected to the battery cover 24 by being welded to the safety valve mechanism 25. The anode lead 35 is welded and electrically connected to the battery can 21.

Figure 3:
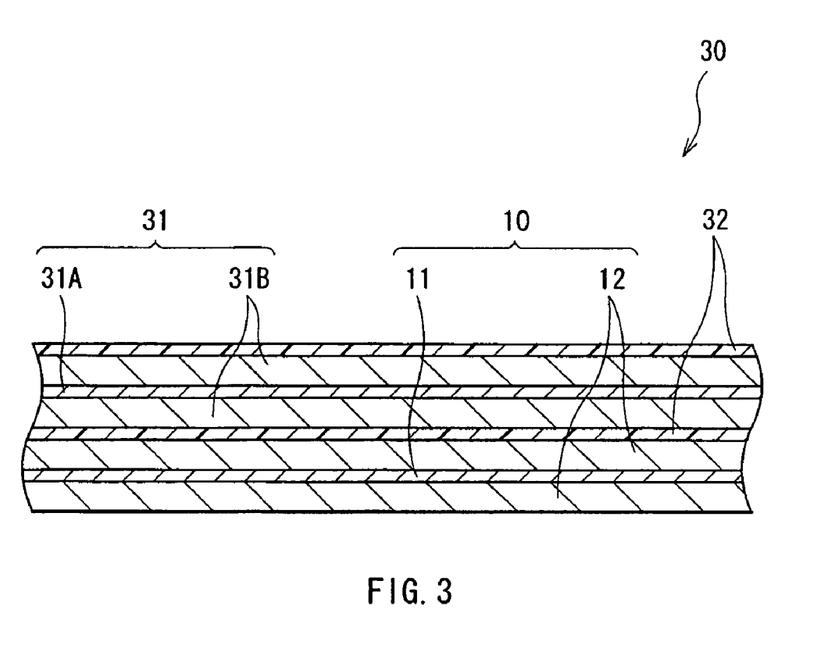
FIG. 3 is a cross section showing an enlarged part of a spirally wound electrode body in the secondary battery shown in FIG. 2.

FIG. 3 shows an enlarged part of the spirally wound electrode body 30 shown in FIG. 2. The anode 10 has the structure described above. Thereby, exothermic reaction between lithium as the electrode reactant inserted in the anode active material and fluorine in the binder can be inhibited. In FIG. 3, the anode active material layer 12 is formed on the both faces of the anode current collector 11.

The cathode 31 has a structure in which a cathode active material layer 31B is provided on the both faces or the single face of a cathode current collector 31A having a pair of opposed faces. The cathode current collector 31A is made of, for example, a metal foil such as an aluminum foil. The cathode active material layer 31B contains, for example, as a cathode active material, one or more cathode materials capable of inserting and extracting lithium as the electrode reactant. If necessary, the cathode active material layer 31B may contain an electrical conductor such as an artificial graphite and carbon black, and a binder such as polyvinylidene fluoride.

As a cathode material capable of inserting and extracting lithium, a metal sulfide or a metal oxide containing no lithium such as $TiS_2$, $MoS_2$, $NbSe_2$, and $V_2O_5$; a lithium complex oxide having a main compound expressed by a chemical formula, $Li_xM1O_2$ (M1 represents one or more transition metals. The value of x varies according to charge and discharge states of the battery, and is generally in the range of $0.05 \leq x \leq 1.10$); a specific polymer or the like can be cited. One cathode material may be used singly, or two or more cathode materials may be used by mixing.

Specially, a lithium complex oxide containing at least one from the group consisting of cobalt, nickel, and manganese as a transition metal M1 in the chemical formula, $Li_xM1O_2$ is preferable. Specifically, $LiCoO_2$, $LiNiO_2$, $LiNi_yCo_{1-y}O_2$ ($0<y<1$), $LiNi_sCo_tMn_uO_2$ ($0<s<1$, $0<t<1$, $0<u<1$, and $s+t+u=1$), or a lithium manganese complex oxide such as $LiMn_2O_4$ can be cited. These lithium complex oxides can provide a high voltage and a high energy density.

The separator 32 is made of, for example, a synthetic resin porous film made of polytetrafluoroethylene, polypropylene, polyethylene or the like, or a ceramics porous film. The separator 32 may have a structure in which two or more of the foregoing porous films are layered.

An electrolytic solution, which is the liquid electrolyte, is impregnated in the separator 32. The electrolytic solution contains, for example, a solvent and an electrolyte salt dissolved in the solvent.

As a solvent, for example, ethylene carbonate, propylene carbonate, 1,3-dioxol-2-one, γ-butyrolactone, sulfolane, methyl sulfolane, diethyl carbonate, dimethyl carbonate, ethyl methyl carbonate or the like can be cited. One solvent may be used singly, or two or more solvents may be used by mixing.

As an electrolyte salt, for example, $LiClO_4$, $LiAsF_6$, $LiPF_6$, $LiBF_4$, $LiB(C_6H_5)_4$, $CH_3SO_3Li$, $CF_3SO_3Li$, $LiCl$, or $LiBr$ is used. Any of the forgoing may be used singly, or two or more thereof may be used by mixing.

The secondary battery can be manufactured, for example, as follows.

First, for example, the anode 10 is formed as described above. Next, for example, a cathode material, and an electrical conductor and a binder if necessary are mixed to prepare a cathode mixture, which is dispersed in a solvent such as N-methyl-2-pyrrolidone to form the cathode mixture slurry. Next, the cathode current collector 31A is coated with the cathode mixture slurry, which is dried and compression-molded, and thereby the cathode active material layer 31B is formed and the cathode 31 is formed.

Subsequently, the cathode lead 34 is attached to the cathode current collector 31A by welding or the like, and the anode lead 35 is attached to the anode current collector 11 by welding or the like. After that, the cathode 31 and the anode 10 are layered and wound with the separator 32 inbetween. The end of the cathode lead 34 is welded to the safety valve mechanism 25, and the end of the anode lead 35 is welded to the battery can 21. The wound cathode 31 and the wound anode 10 are sandwiched between the pair of insulating plates 22 and 23, and contained inside the battery can 21. Next, for example, an electrolyte is injected into the battery can 21 and impregnated in the separator 32. After that, at the open end of the battery can 21, the battery cover 24, the safety valve mechanism 25, and the PTC device 26 are fixed by being caulked through the gasket 27. The secondary battery shown in FIG. 2 and FIG. 3 is thereby formed.

In the secondary battery, when charged, lithium ions are extracted from the cathode active material layer 31B and inserted in the anode active material layer 12 through the electrolyte impregnated in the separator 32. Next, when discharged, lithium ions are extracted from the anode active material layer 12 and inserted in the cathode active material layer 31B through the electrolyte impregnated in the separator 32. In the secondary battery, when lithium ions are inserted in the anode active material layer 12, battery temperatures are increased due to exothermic reaction between lithium and fluorine in the binder. However, since the calorific value by differential scanning calorimetry is in the foregoing range, the amount of fluorine exothermically reacting with lithium is sufficiently decreased, and thereby the exothermic reaction is inhibited.

As above, according to the anode 10 of this embodiment, the anode 10 has the anode current collector 11 and the anode active material layer 12 provided on the anode current collector 11. The anode active material layer 12 contains an anode active material and a polymer containing vinylidene fluoride as a component. The calorific value by differential scanning calorimetry in charging the anode active material layer 12 is 500 J/g or less in the range from 230 deg C. to 370 deg C., or the difference between the maximum value of calorific value and the calorific value at 100 deg C. is 1.70 W/g or less. Therefore, exothermic reaction between lithium in the anode 10 and fluorine in the polymer can be inhibited. Consequently, according to the secondary battery of this embodiment using the anode 10, increase in battery temperatures can be inhibited.

In particular, when the calorific value in the range from 230 deg C. to 370 deg C. is 400 J/g or less, or the difference between the maximum value of calorific value and the calorific value at 100 deg C. is 1.60 W/g or less, increase in battery temperatures can be more inhibited.

(Second Battery)

Figure 4:
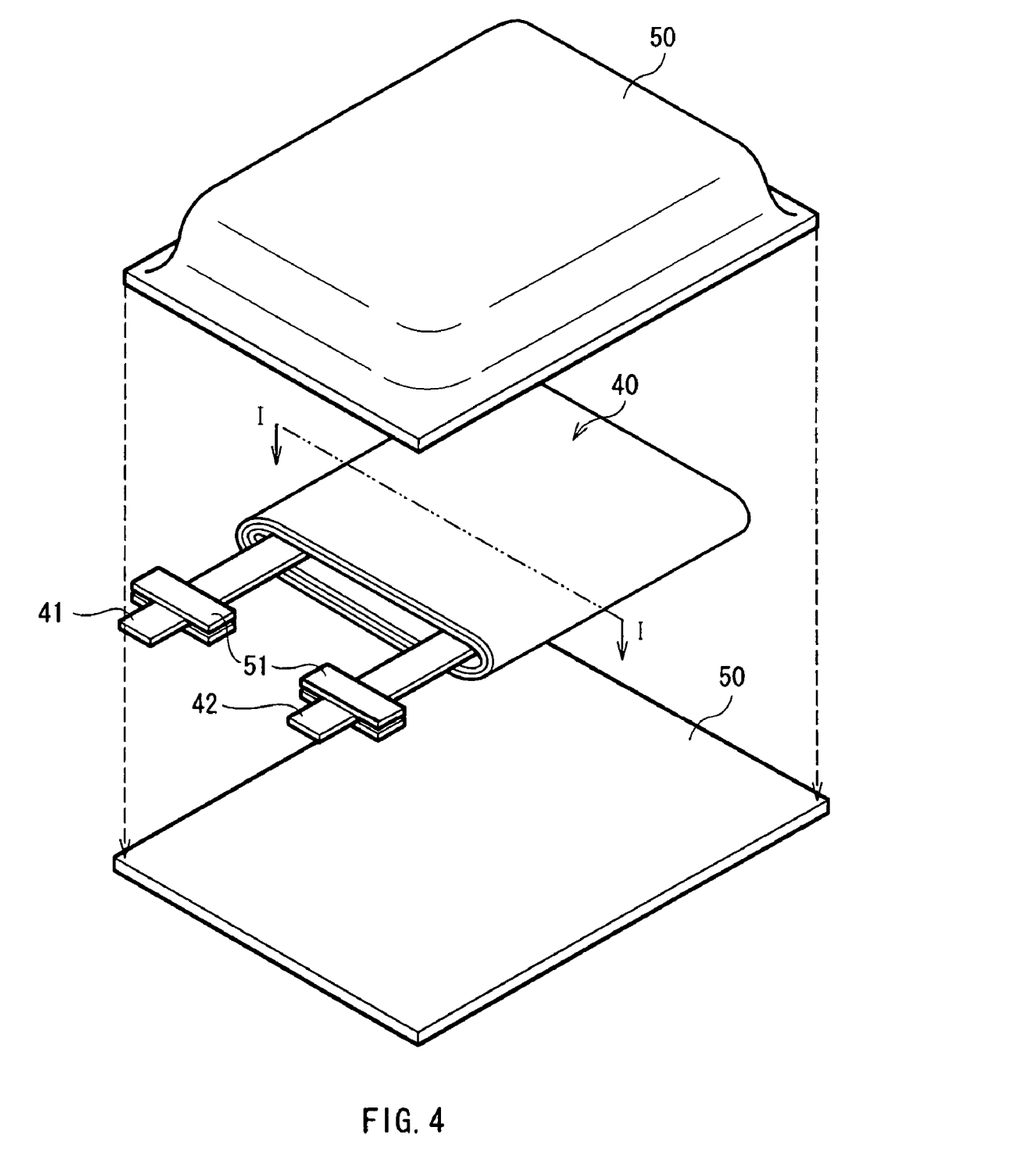
FIG. 4 is an exploded perspective view showing a structure of another secondary battery using the anode shown in FIG. 1.

FIG. 4 shows a structure of a second secondary battery. In the secondary battery, a spirally wound electrode body 40 on which a cathode lead 41 and an anode lead 42 are attached is contained inside a film package member 50. Therefore, a small, light, and thin secondary battery can be obtained.

The cathode lead 41 and the anode lead 42 are respectively directed from inside to outside of the package member 50 in the same direction, for example. The cathode lead 41 and the anode lead 42 are respectively made of, for example, a metal material such as aluminum, copper, nickel, and stainless, and are in a state of thin plate or mesh, respectively.

The package member 50 is made of a rectangular aluminum laminated film in which, for example, a nylon film, an aluminum foil, and a polyethylene film are bonded together in this order. The package member 50 is, for example, arranged so that the polyethylene film side and the spirally wound electrode body 40 are opposed, and the respective outer edges are contacted to each other by fusion bonding or an adhesive. Adhesive films 51 to protect from outside air intrusion are inserted between the package member 50 and the cathode lead 41, the anode lead 42. The adhesive film 51 is made of a material having contact characteristics to the cathode lead 41 and the anode lead 42 such as a polyolefin resin of polyethylene, polypropylene, modified polyethylene, and modified polypropylene.

The package member 50 may be made of a laminated film having other structure, a high molecular weight film such as polypropylene, or a metal film, instead of the foregoing aluminum laminated film.

Figure 5:
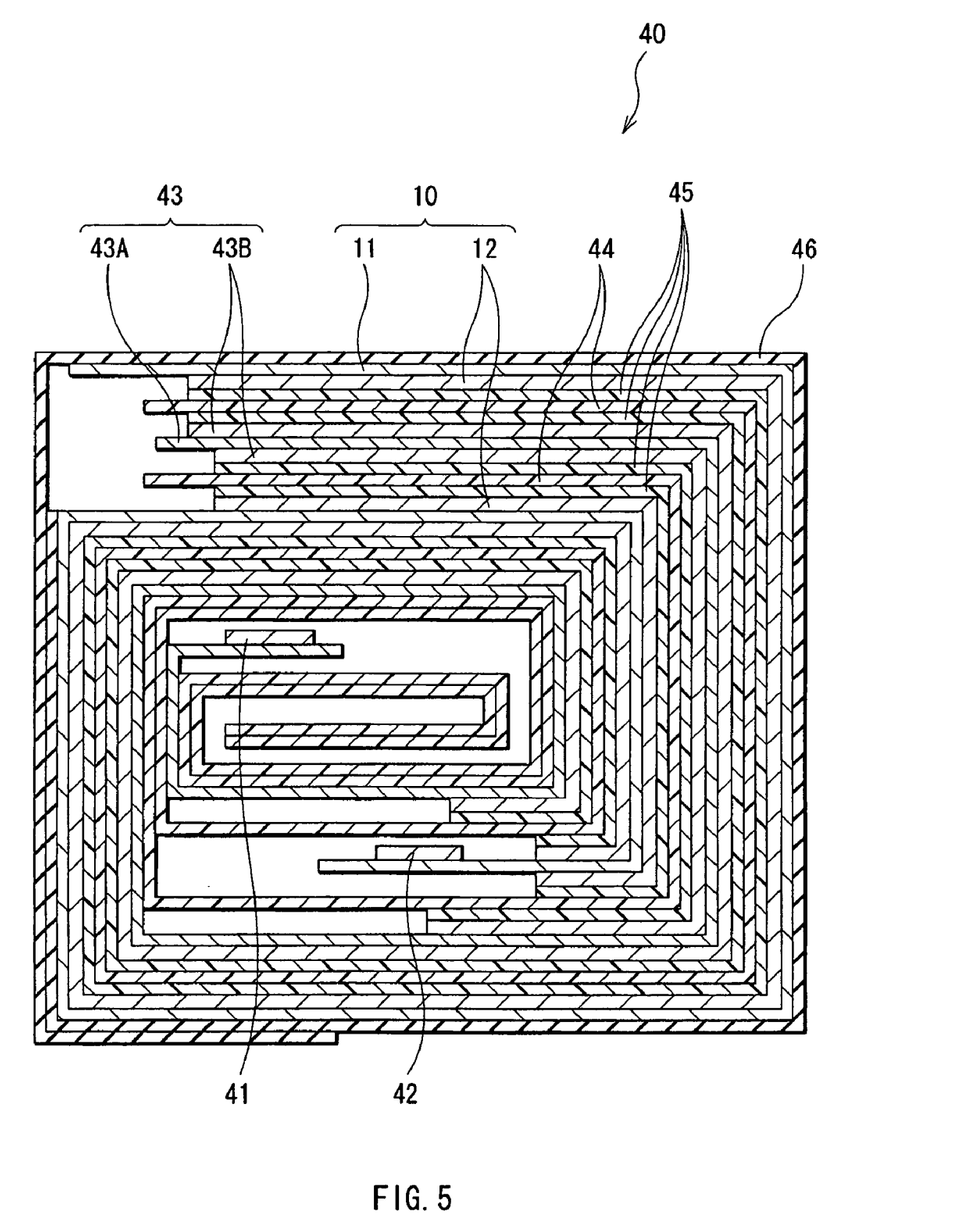
FIG. 5 is a cross section showing a structure taken along line I-I of a spirally wound electrode body shown in FIG. 4.

FIG. 5 shows a cross sectional structure taken along line I-I of the spirally wound electrode body 40 shown in FIG. 4. In the spirally wound electrode body 40, a cathode 43 and the anode 10 are layered with a separator 44 and an electrolyte layer 45 inbetween and wound. The outermost periphery thereof is protected by a protective tape 46.

The cathode 43 has a structure in which a cathode active material layer 43B is provided on the single face or the both faces of the cathode current collector 43A. The anode 10 also has a structure in which the anode active material layer 12 is provided on the single face or the both faces of the anode current collector 11. Arrangement is made so that the anode active material layer 12 side is opposed to the cathode active material layer 43B. Structures of the cathode current collector 43A, the cathode active material layer 43B, and the separator 44 are similar to of the cathode current collector 31A, the cathode active material layer 31B, and the separator 32 respectively described above.

The electrolyte layer 45 is in a so-called gelatinous state, containing an electrolytic solution and a high molecular weight compound to become a holding body which holds the electrolytic solution. The gelatinous electrolyte layer 45 is preferable, since a high ion conductivity can be thereby obtained, and leak of the battery can be thereby prevented. The structure of the electrolytic solution (that is, a solvent, an electrolyte salt and the like) is similar to of the cylindrical-type secondary battery shown in FIG. 2. As a high molecular weight compound, for example, a fluorinated high molecular weight compound such as polyvinylidene fluoride and a copolymer of vinylidene fluoride and hexafluoropropylene; an ether high molecular weight compound such as polyethylene oxide and a cross-linked body containing polyethylene oxide; polyacrylonitrile or the like can be cited. In particular, in view of redox stability, the fluorinated high molecular weight compound is desirable.

The secondary battery can be manufactured, for example, as follows.

First, the cathode 43 and the anode 10 are respectively coated with a precursor solution containing a solvent, an electrolyte salt, a high molecular weight compound, and a mixed solvent. The mixed solvent is volatilized to form the electrolyte layer 45. After that, the cathode lead 41 is attached to the end of the cathode current collector 43A by welding, and the anode lead 42 is attached to the end of the anode current collector 11 by welding. Next, the cathode 43 and the anode 10 formed with the electrolyte layer 45 are layered with the separator 44 inbetween to obtain a lamination. After that, the lamination is wound in the longitudinal direction, the protective tape 46 is adhered to the outermost periphery thereof to form the spirally wound electrode body 40. Lastly, for example, the spirally wound electrode body 40 is sandwiched between the package members 50, and outer edges of the package members 50 are contacted by thermal fusion-bonding or the like to enclose the spirally wound electrode body 40. Then, the adhesive films 51 are inserted between the cathode lead 41, the anode lead 42 and the package member 50. Thereby, the secondary battery shown in FIG. 4 and FIG. 5 is completed.

Otherwise, the secondary battery may be fabricated as follows. First, as described above, the cathode 43 and the anode 10 are formed, and the cathode lead 41 and the anode lead 42 are attached to the cathode 43 and the anode 10. After that, the cathode 43 and the anode 10 are layered with the separator 44 inbetween and wound. Then, the protective tape 46 is adhered to the outermost periphery thereof, and a winding body as the precursor of the spirally wound electrode body 40 is formed. Next, the winding body is sandwiched between the package members 50, the outermost peripheries except for one side are thermal fusion-bonded to obtain a pouched state, and the winding body is contained inside the package member 50. Subsequently, a composition of matter for electrolyte containing a solvent, an electrolyte salt, a monomer as the raw material for the high molecular weight compound, a polymerization initiator, and if necessary other material such as a polymerization inhibitor is prepared, which is injected into the package member 50.

After the composition of matter for electrolyte is injected, the opening of the package member 50 is thermal fusion-bonded and hermetically sealed in the vacuum atmosphere. Next, the resultant is heated to polymerize the monomer to obtain a high molecular weight compound. Thereby, the gelatinous electrolyte layer 45 is formed, and the secondary battery shown in FIG. 4 is assembled.

The secondary battery works and provides effects similarly to the first secondary battery.

EXAMPLES

Further, specific examples of the present invention will be hereinafter described in detail.

Examples 1-1 to 1-4

The secondary batteries shown in FIG. 2 were fabricated. First, pulverized graphite powder as the anode active material and polyvinylidene fluoride as the binder were mixed. The mixture was dispersed in N-methyl-2-pyrrolidone as the solvent to obtain anode mixture slurry. After that, the anode current collector 11 made of a copper foil was uniformly coated with the anode mixture slurry, which was dried, compression-molded by a roll pressing machine, and heat-treated to form the anode active material layer 12 and form the anode 10. Then, graphite powder and polyvinylidene fluoride were mixed at a weight ratio of graphite powder: polyvinylidene fluoride that equals 90:10. Further, conditions of heat treatment were changed to decrease the calorific value. After that, the anode lead 35 made of nickel was attached to the end of the anode current collector 11.

Further, lithium carbonate ($Li_2CO_3$) and cobalt carbonate ($CoCO_3$) were mixed at a mole ratio of 0.5:1, the mixture was fired for 5 hours at 900 deg C. in the air to obtain lithium cobalt complex oxide ($LiCoO_2$). The $LiCoO_2$, graphite as the electrical conductor, polyvinylidene fluoride as the binder were mixed, the mixture was dispersed in N-methyl-2-pyrrolidone as the solvent to obtain a cathode mixture slurry. After that, the cathode current collector 31A made of an aluminum foil being 20 μm thick was uniformly coated with the cathode mixture slurry, which was dried and compression-molded to form the cathode active material layer 31B and form the cathode 31. Then, $LiCoO_2$, graphite, and polyvinylidene fluoride were mixed at a weight ratio of $LiCoO_2$: graphite:polyvinylidene fluoride that equals 91:6:10. After that, the cathode lead 34 made of aluminum was attached to the end of the cathode current collector 31A.

After the cathode 31 and the anode 10 were respectively formed, the separator 32 made of a polyethylene film being 20 μm thick was prepared. The anode 10, the separator 32, the cathode 31, and the separator 32 were layered in this order, and the lamination was wound spirally several times to form the spirally wound electrode body 30.

After the spirally wound electrode body 30 was formed, the spirally wound electrode body 30 was sandwiched between the pair of insulating plates 22 and 23. The anode lead 35 was welded to the battery can 21, and the cathode lead 34 was welded to the safety valve mechanism 25. The spirally wound electrode body 30 was contained inside the battery can 21 made of nickel-plated iron. After that, an electrolytic solution was injected into the battery can 21 by depressurization method. For the electrolytic solution, an electrolytic solution obtained by dissolving $LiPF_6$ as an electrolyte salt in the solvent in which ethylene carbonate and ethyl methyl carbonate were mixed at a volume ratio of 1:1 so that $LiPF_6$ became 1 mol/dm$^3$ was used.

After the electrolytic solution was injected, the battery can 21 was caulked through the gasket 27 with the surface coated with asphalt, and thereby the safety valve mechanism 25, the PTC device 26, and the battery cover 24 were fixed, and airtightness inside the battery was retained. The cylindrical secondary battery shown in FIG. 2 was thereby fabricated.

The obtained secondary batteries of Examples 1-1 to 1-4 were charged so that the battery voltage became 4.20 V. The charged battery was disassembled, and the anode 10 was taken out and washed with dimethyl carbonate. Next, 4 mg of the anode active material layer 12 of the anode 10 was obtained, which was provided with differential scanning calorimetry. The calorific value at from 230 deg C. to 370 deg C. and the difference between the maximum value of calorific value and the calorific value at 100 deg C. were examined. The results are shown in Table 1.

TABLE 1

| | Calorific value at from 230 deg C. to 370 deg C. (J/g) | Calorific value (maximum value) − calorific value (100 deg C.) (W/g) | Battery temperatures (deg C.) |
|---|---|---|---|
| Example 1-1 | 300 | 1.3 | 105 |
| Example 1-2 | 350 | 1.35 | 110 |
| Example 1-3 | 400 | 1.6 | 120 |
| Example 1-4 | 500 | 1.7 | 145 |
| Comparative example 1-1 | 510 | 1.73 | 155 |
| Comparative example 1-2 | 600 | 2.12 | 170 |

As Comparative example 1-1 relative to Examples 1-1 to 1-4, a secondary battery was fabricated as in Examples 1-1 to 1-4, except that the anode 10 was formed without heat treatment. Further, as Comparative example 1-2, a secondary battery was fabricated as in Examples 1-1 to 1-4, except that the anode 10 was formed with heat treatment conditions changed. For these secondary batteries, as in Examples 1-1 to 1-4, the calorific value at from 230 deg C. to 370 deg C. and the difference between the maximum value of calorific value and the calorific value at 100 deg C. were also examined. The results are also shown in Table 1.

Separately from the foregoing secondary batteries, secondary batteries fabricated as in Examples 1-1 to 1-4 and Comparative examples 1-1 and 1-2 were prepared. The secondary battery was charged so that the battery voltage became 4.35 V. A nail being 2.5 mm in diameter was penetrated through the secondary battery to measure the maximum value of the battery temperatures. The results are shown in Table 1 and FIGS. 6 and 7. The battery in which the maximum value of the battery temperatures was 150 deg C. or less was regarded as fair quality.

Figure 6:
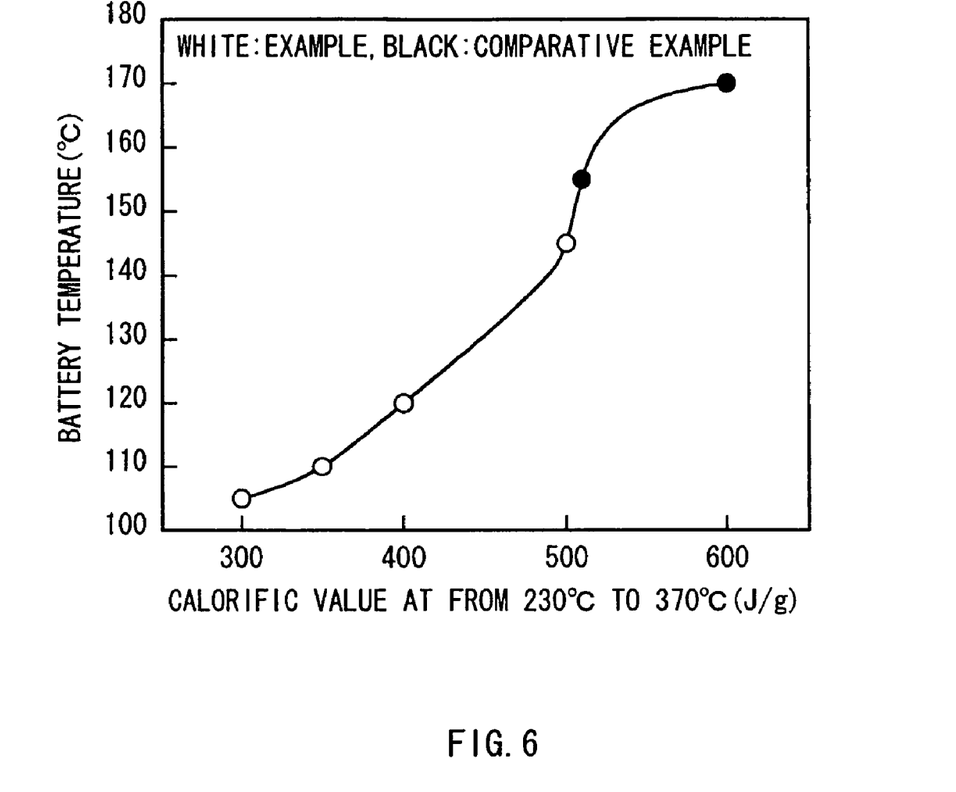
FIG. 6 is a characteristics view showing a relation between calorific values at from 230 deg C. to 370 deg C. by differential scanning calorimetry and battery temperatures.
Figure 7:
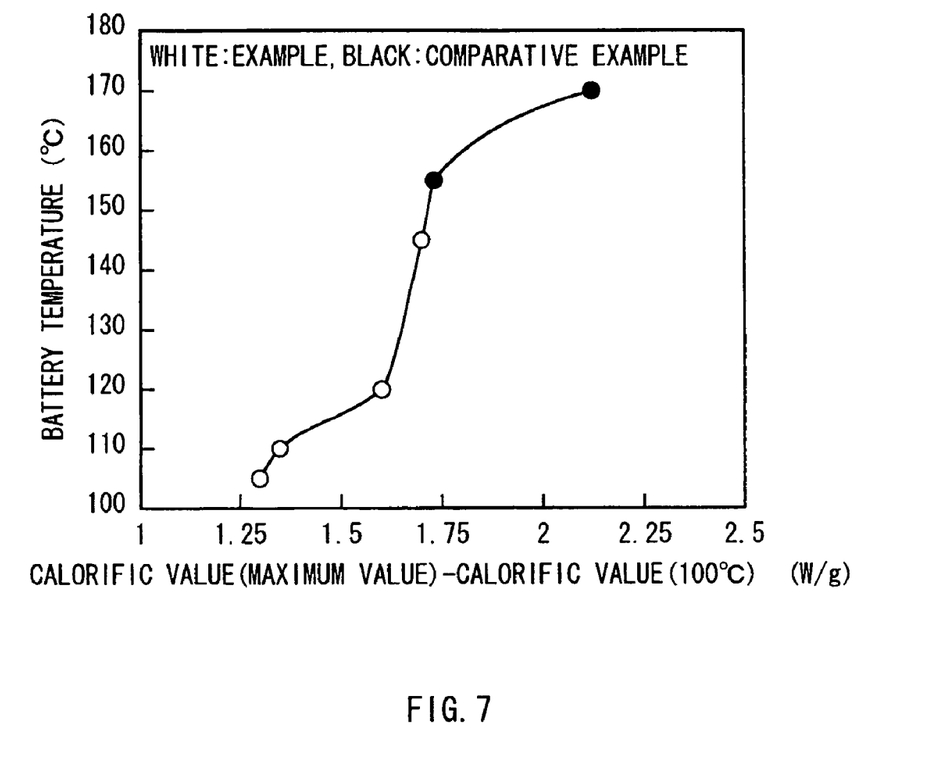
FIG. 7 is a characteristics view showing a relation between calorific value differences by differential scanning calorimetry and battery temperatures.

As evidenced by Table 1 and FIGS. 6 and 7, according to Examples 1-1 to 1-4, in which the calorific value at from 230 deg C. to 370 deg C. by differential scanning calorimetry was 500 J/g or less, or the difference between the maximum value of calorific value and the calorific value at 100 deg C. was 1.7 W/g or less, the maximum value of the battery temperatures was lower, 150 deg C. or less, compared to Comparative examples 1-1 and 1-2, in which the calorific value at from 230 deg C. to 370 deg C. was over 500 J/g, or the difference between the maximum value of calorific value and the calorific value at 100 deg C. was over 1.7 W/g. In particular, in Examples 1-1 to 1-3, in which the calorific value at from 230 deg C. to 370 deg C. was 400 J/g or less, or the difference between the maximum value of calorific value and the calorific value at 100 deg C. was 1.6 W/g or less, the maximum value of the battery temperatures was low.

That is, it was found that if the calorific value by differential scanning calorimetry when the anode active material layer 12 was charged in the range from 230 deg C. to 370 deg C. was 500 J/g or less, or the difference between the maximum value of calorific value and the calorific value at 100 deg C. was 1.7 W/g or less, increase in the battery temperatures could be inhibited. In particular, it was found that the calorific value in the range from 230 deg C. to 370 deg C. was preferably 400 J/g or less, or the difference between the maximum value of calorific value and the calorific value at 100 deg C. was preferably 1.6 W/g or less.

Example 2-1

The secondary battery shown in FIG. 4 and FIG. 5 was fabricated. First, as in Example 1-3, the cathode 43 and the anode 10 were formed, and the cathode lead 41 and the anode lead 42 were attached.

Subsequently, ethylene carbonate and propylene carbonate as the solvent, $LiPF_6$ as the electrolyte salt, polyvinylidene fluoride as the high molecular weight compound, dimethyl carbonate as the mixed solvent were mixed. The mixture was dissolved to form a sol precursor solution.

The cathode 43 and the anode 10 were respectively coated with the obtained precursor solution by using a bar coater. The mixed solvent was volatilized to form the gelatinous electrolyte layer 45.

After that, the cathode 43 and the anode 10 respectively formed with the electrolyte layer 45 were layered with the separator 44 made of a polyethylene film being 20 μm thick inbetween, the lamination was wound to form the spirally wound electrode body 40.

The obtained spirally wound electrode body 40 was sandwiched by the package members 50 made of a laminated film, and enclosed therein under depressurization. Thereby, the secondary battery shown in FIG. 4 and FIG. 5 was fabricated.

The obtained secondary battery was charged so that the battery voltage became 4.20 V. The charged battery was disassembled, and the anode 10 was taken out, which was provided with differential scanning calorimetry as in Examples 1-1 to 1-4. The calorific value at from 230 deg C. to 370 deg C. and the difference between the maximum value of calorific value and the calorific value at 100 deg C. were examined. The results are shown in Table 2.

TABLE 2

| | Electrolyte | Calorific value at from 230 deg C. to 370 deg C. (J/g) | Calorific value (maximum value) − calorific value (100 deg C.) (W/g) | Battery temperatures (deg C.) |
|---|---|---|---|---|
| Example 1-3 | Liquid | 400 | 1.6 | 120 |
| Example 2-1 | Gelatinous | 400 | 1.6 | 115 |

Separately from the foregoing secondary battery, a secondary battery similarly fabricated was prepared. Then, as in Examples 1-1 to 1-4, the secondary battery was charged so that the battery voltage became 4.35 V. A nail being 2.5 mm in diameter was penetrated through the battery to measure the maximum value of the battery temperatures. The result is shown in Table 2.

As evidenced by Table 2, the results similar to of Examples 1-1 to 1-4 were obtained. That is, it was found that in the case of using the gelatinous electrolyte, if the calorific value by differential scanning calorimetry when the anode active material layer 12 was charged was 500 J/g or less in the range from 230 deg C. to 370 deg C., or the difference between the maximum value of calorific value and the calorific value at 100 deg C. was 1.7 W/g or less, increase in the battery temperatures could be inhibited.

The present invention has been described with reference to the embodiment and the examples. However, the present invention is not limited to the embodiment and the examples, and various modifications may be made. For example, in the foregoing embodiment and examples, descriptions have been given with reference to the secondary battery having the winding structure. However, the present invention can be similarly applied to a secondary battery having other shape using package members such as a coin-type secondary battery, a sheet-type secondary battery, a button-type secondary battery, and a square type secondary battery, or a secondary battery having a laminated structure in which a cathode and an anode are layered several times.

Further, in the foregoing embodiment and examples, descriptions have been given of the battery using lithium as an electrode reactant. However, the present invention can be also applied to the case that other element in Group 1 in the long period periodic table such as sodium (Na) and potassium (K), an element in Group 2 in the long period periodic table such as magnesium and calcium (Ca), other light metal such as aluminum, or an alloy of lithium or the foregoing elements is used as long as reactive to the anode active material and similar effects can be thereby obtained. Then, the cathode active material capable of inserting and extracting the electrode reactant, the solvent or the like can be selected according to the electrode reactant.

Further, in the foregoing embodiment and examples, descriptions have been given of the case using the electrolytic solution as the liquid electrolyte or the case using the gelatinous electrolyte in which the electrolytic solution is held in the high molecular weight compound. However, other electrolyte may be used instead of these electrolytes. As other electrolyte, for example, a solid electrolyte having ion conductivity, a mixture of a solid electrolyte and an electrolytic solution, or a mixture of a solid electrolyte and a gelatinous electrolyte can be cited.

For the solid electrolyte, for example, a high molecular weight solid electrolyte in which an electrolyte salt is dispersed in a high molecular weight compound having ion conductivity, or an inorganic solid electrolyte formed of ion conductive glass, ionic crystal or the like can be used. Then, as a high molecular weight compound, for example, an ether high molecular weight compound such as polyethylene oxide and a cross-linked body containing polyethylene oxide, an ester high molecular weight compound such as poly methacrylate, or an acrylate high molecular weight compound can be used singly, by mixing, or by copolymerization in molecules. As an inorganic solid electrolyte, lithium nitride, lithium iodide or the like can be used.

It should be understood by those skilled in the art that various modifications, combinations, sub-combinations and alternations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An anode for use in a battery comprising an anode current collector and an anode active material layer provided on the anode current collector,
   wherein the anode active material layer includes an anode active material and a polymer containing vinylidene fluoride as a component, wherein the anode active material is a carbon material,
   wherein a calorific value at temperatures from about 230° C. to about 370° C. by differential scanning calorimetry when the anode active material layer is in a state of being charged is 500 J/g or less,
   wherein a calorific difference between the calorific value at a maximum value and at about 100° C. when the anode active material is in a state of being charged to 4.2 V ranges from 1.3 W/g to 1.7 W/g,
   wherein the calorific value is measured for a reaction between lithium inserted in the anode and fluorine, and
   wherein the calorific difference is determined before the anode active material has been discharged.

2. The anode according to claim 1, wherein the calorific value at temperatures from about 230° C. to about 370° C. by differential scanning calorimetry when the anode active material layer is in a state of being charged is not less than 300 J/g.

3. The anode according to claim 1, wherein the calorific difference ranges from 1.3 W/g to 1.6 W/g.

4. A battery comprising:
   a cathode; an anode; and
   an electrolyte,
   wherein the anode has an anode current collector and an anode active material layer provided on the anode current collector,
   the anode active material layer includes an anode active material and a polymer containing vinylidene fluoride as a component, wherein the anode active material is a carbon material,
   wherein a calorific value at temperatures from about 230° C. to about 370° C. by differential scanning calorimetry when the anode active material layer is in a state of being charged is 500 J/g or less,
   wherein a calorific difference between the calorific value at a maximum value and at about 100° C. when the anode active material is in a state of being charged to 4.2 V ranges from 1.3 W/g to 1.7 W/g, wherein the calorific value is measured for a reaction between lithium inserted in the anode and fluorine, and
   wherein the calorific difference is determined before the anode active material has been discharged.

5. The battery according to claim 4, wherein the calorific value at temperatures from about 230° C. to about 370° C. by differential scanning calorimetry when the anode active material layer is in a state of being charged is not less than 300 J/g.

6. The battery according to claim 4, wherein the calorific difference ranges from 1.3 W/g to 1.6 W/g.

7. The battery according to claim 4, wherein the electrolyte is in a gelatinous state.

* * * * *